United States Patent [19]

Harris

[11] Patent Number: 5,449,086

[45] Date of Patent: Sep. 12, 1995

[54] DELAYED ACTUATION FUEL CAP

[75] Inventor: Robert S. Harris, Connersville, Ind.

[73] Assignee: Stant Manufacturing Inc., Connersville, Ind.

[21] Appl. No.: 138,397

[22] Filed: Oct. 18, 1993

[51] Int. Cl.⁶ .............................................. B65D 41/04
[52] U.S. Cl. .................................... 220/288; 220/303; 220/304; 220/DIG. 33
[58] Field of Search ................ 220/288, 203, 303, 304, 220/DIG. 33

[56] References Cited

U.S. PATENT DOCUMENTS

| | | |
|---|---|---|
| 2,006,752 | 7/1935 | Swank . |
| 2,591,562 | 4/1952 | Levell . |
| 2,792,964 | 5/1957 | Reese et al. . |
| 2,865,531 | 12/1958 | Gorst et al. . |
| 2,964,214 | 12/1960 | Stannard . |
| 2,990,971 | 7/1961 | Enell . |
| 3,082,905 | 3/1963 | Friend . |
| 3,098,636 | 7/1963 | Contella . |
| 3,111,239 | 11/1963 | Ivins . |
| 3,112,840 | 12/1963 | Miller et al. . |
| 3,147,881 | 9/1964 | Friend . |
| 3,163,315 | 12/1964 | Wilson . |
| 3,186,580 | 6/1965 | Previte . |
| 3,203,445 | 8/1965 | McCormick . |
| 3,373,894 | 3/1968 | Johnson . |
| 3,434,621 | 3/1969 | Previte . |
| 3,587,912 | 6/1971 | Nagoya et al. . |
| 3,616,960 | 11/1971 | Miller et al. . |
| 3,703,245 | 11/1972 | Brewer . |
| 3,854,911 | 12/1974 | Walker . |
| 4,036,399 | 7/1977 | Gerdes . |
| 4,083,209 | 4/1978 | Sloan, Jr. . |
| 4,091,955 | 5/1978 | Sloan, Sr. . |
| 4,102,472 | 7/1978 | Sloan, Jr. . |
| 4,107,961 | 8/1978 | Evans . |
| 4,177,931 | 12/1979 | Evans . |
| 4,228,915 | 10/1980 | Hooper et al. . |
| 4,245,751 | 1/1981 | Neiman . |
| 4,271,976 | 6/1981 | Detwiller . |
| 4,280,346 | 7/1981 | Evans . |
| 4,337,873 | 7/1982 | Johnson . |
| 4,458,823 | 7/1984 | Baker . |
| 4,458,824 | 7/1984 | Baker et al. . |
| 4,494,673 | 1/1985 | Hiraishi . |
| 4,498,493 | 2/1985 | Harris . |
| 4,572,396 | 2/1986 | Kasugai et al. . |
| 4,579,244 | 4/1986 | Fukuta . |
| 4,588,102 | 5/1986 | Kasugai . |
| 4,666,056 | 5/1987 | Kasugai et al. . |
| 4,676,390 | 6/1987 | Harris . |
| 4,678,097 | 7/1987 | Crute . |
| 4,726,488 | 2/1988 | Kasugai . |
| 4,765,505 | 8/1988 | Harris . |
| 4,795,053 | 1/1989 | Kasugai et al. . |
| 4,854,471 | 8/1989 | Kasugai et al. . |
| 4,887,733 | 12/1989 | Harris .................................. 220/203 |
| 4,913,303 | 4/1990 | Harris . |
| 5,108,001 | 4/1992 | Harris .................................. 220/203 |
| 5,110,003 | 5/1992 | MacWilliams . |
| 5,183,173 | 2/1993 | Heckman ................. 220/DIG. 33 X |

FOREIGN PATENT DOCUMENTS

| | | |
|---|---|---|
| 2161374 | 6/1973 | Germany . |
| 2206583 | 8/1973 | Germany . |

Primary Examiner—Allan M. Shoap
Assistant Examiner—Nathan J. Newhouse
Attorney, Agent, or Firm—Barnes & Thornburg

[57] ABSTRACT

A filler neck cap is provided for closing a threaded filler neck of a tank. The cap includes a housing having threads for engaging the filler neck, a seal for sealingly engaging the filler neck upon rotation of the housing in a first direction, and a handle for rotating the housing relative to the filler neck. The handle includes a top wall and an appendage directly appended to the underside of the top wall and cantilevered downwardly therefrom at a point spaced apart from the axis of rotation of the handle. The cap further includes a delayed actuation mechanism for providing a lost-motion driving connection between the handle and the housing. The delayed actuation mechanism includes an annular ring engaging the housing and a driven lug appended to the annular ring. The driven lug engages a terminal portion of the appendage during rotation of the handle about its axis of rotation to provide the driving connection between the handle and the housing.

31 Claims, 2 Drawing Sheets

DELAYED ACTUATION FUEL CAP

BACKGROUND AND SUMMARY OF THE INVENTION

The present invention relates to fuel caps for closing filler necks of vehicle fuel tanks. More particularly, the present invention relates to a threaded fuel cap that provides a lost motion driving connection between a handle and a closure member to delay actuation of the closure member in a cap-removal direction.

Conventional fuel caps for closing threaded filler necks of vehicle fuel tanks generally include an outer handle or shell that is coupled for rotation to a closure member or housing. The housing is normally formed to include threads that are configured to engage corresponding threads formed on the filler neck. It is known to provide a torque override driving connection between the handle and housing to prevent overtightening of the housing within the filler neck during installation of the cap on the filler neck. For example, U.S. Pat. No. 4,280,346 to Evans shows a torque-override cap. It is also known to provide either a direct driving connection or delayed actuation driving connection between the handle and the housing. For example, U.S. Pat. No. 4,765,505 to Harris shows a delayed actuation driving connection fuel cap.

It would be advantageous to provide a fuel cap with a delayed actuation drive connection that includes a minimum number of parts. The cost of manufacturing is reduced and ease of assembly is increased by providing a cap using a minimum number of parts to create a delayed actuation driving connection feature in the cap.

According to the present invention, a cap is provided for use in a filler neck. The cap includes a closure or housing for closing the filler neck and a handle for rotating the closure relative to the filler neck. The cap also includes a delayed action device for providing a lost motion driving connection between the handle and closure. The delayed actuation device includes an annular torque transmission ring engaged with the closure and a driven lug appended to the annular torque transmission ring. The delayed actuation device also includes a drive pin integrally appended to the handle and arranged to engage the driven lug during rotation of the handle about its axis of rotation.

One feature of a cap in accordance with the present invention is that the cap provides a delayed actuation driving connection and includes a minimum number of parts. The handle is illustratively formed to include a drive pin thereon during the manufacturing process so that it is not necessary to provide a separate part having a drive pin and then mount that separate part to the handle during assembly of the cap. This reduces the cost and complexity of manufacturing fuel caps outfitted with delayed actuation driving connections.

In preferred embodiments of the present invention, the delayed actuation device includes a pair of drive pins integrally appended to a downwardly facing wall of the handle and a pair of driven lugs appended to the annular torque transmission ring. Each driven lug is arranged to extend in a radially inward direction toward the axis of rotation of the annular torque transmission ring. The pair of drive pins and pair of driven lugs are arranged relative to one another so that one of the drive pins engages one of the driven lugs during rotation of the handle relative to the filler neck in either a cap advancing direction or a cap removal direction.

Illustratively, the handle is a unitary piece made of molded plastics material. Conveniently, the two drive pins integrally appended to the handle are the integrally formed ejector pins provided on the handle and used in the molding process to manufacture the handle. This further minimizes the cost and complexity of manufacturing by using an existing fuel cap handle mold and cleverly cutting the ejector pins to a predetermined length and configuring driven lugs appended to the annular race so that the shortened ejector pins and the specially constructed driven lugs cooperate to generate a lost motion driving connection between the handle and the cap housing.

Also in preferred embodiments of the present invention, the pair of drive pins and pair of driven lugs are spaced apart to provide a lost motion driving connection between the cap and the filler neck. The lost motion is defined by the distance a drive pin travels once it disengages a first driven lug in one direction until it engages the second driven lug in an opposite direction. One of the driven lugs is L-shaped to define pocket means for holding and releasably retaining one of the drive pins when the cap is moved to its filler neck-closing position.

Advantageously, the L-shaped driven lug retains one of the drive pins to prevent any of the lost motion from being lost due to cap-drifting. This ensures the delayed actuation driving connection will exist when the cap is in its closed position on the filler neck. The other driven lug is arranged to assist in establishing a driving connection between the handle and the cap housing.

Additional objects, features, and advantages of the invention will become apparent to those skilled in the art upon consideration of the following detailed description of a preferred embodiment exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
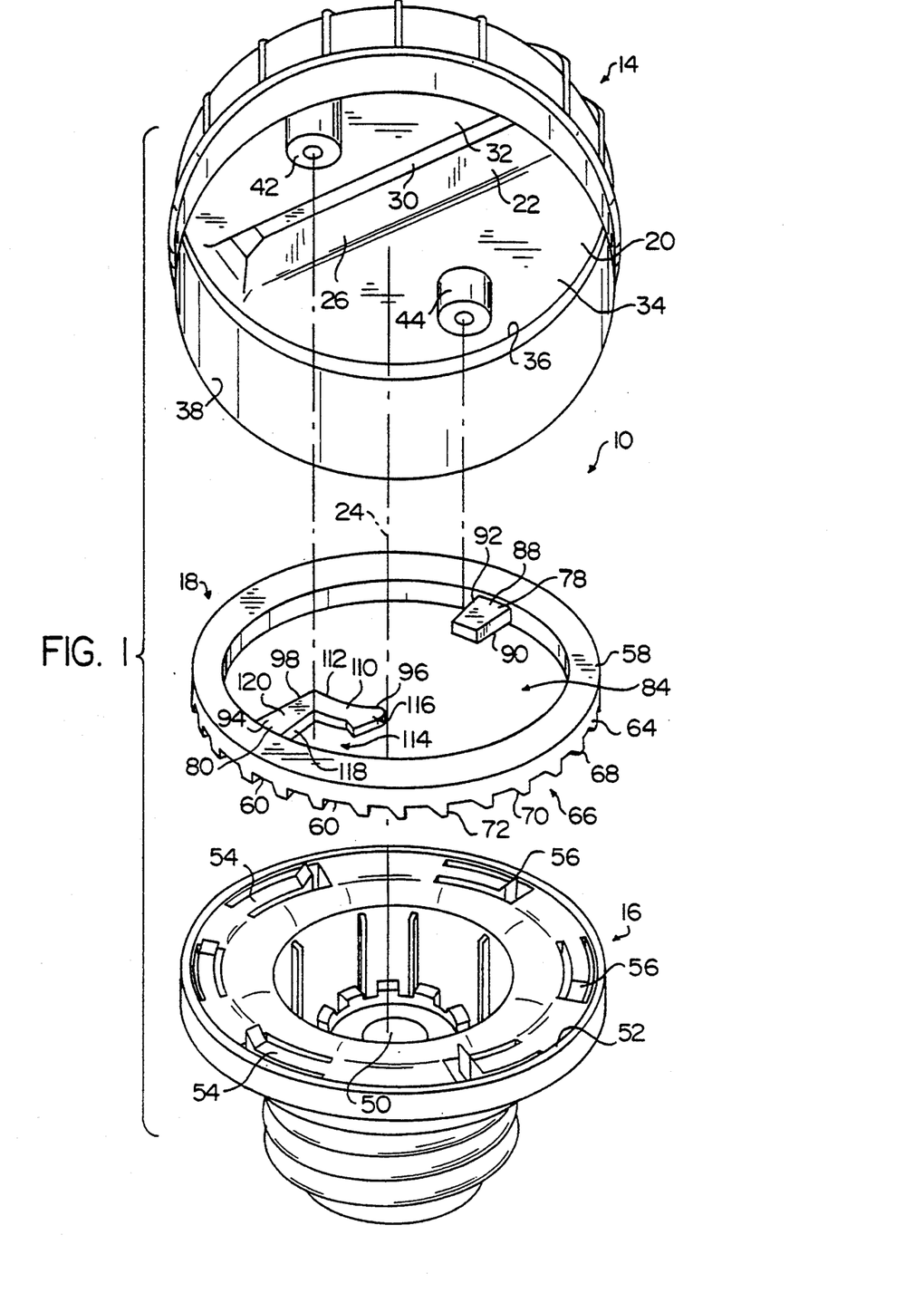
FIG. 1 is an exploded perspective view of the fuel cap showing a threaded housing for closing an open filler neck, an annular torque transmission ring including a straight driven lug and an L-shaped driven lug, and a hollow handle including a pair of integral, downwardly extending drive lugs arranged to engage the driven lugs and establish a lost motion driving connection between the handle and the annular torque transmission ring and housing.

The components of a fuel cap 10 for closing a filler neck 12 are illustrated in FIG. 1. Fuel cap 10 includes a shell or handle 14 used to rotate a closure or housing 16 to close the filler neck 12. An annular torque transmission ring 18 is situated in between the shell 14 and housing 16 to transmit rotation from the shell 14 to the housing 16 during installation on or removal from filler neck 12. One advantage of the fuel cap 10 is that a delayed actuation driving connection between the shell 14 and housing 16 is provided with a minimum number of parts.

The shell 14 includes a top wall 20 with a handle grip 22 formed in the top wall 20. The handle grip 22 is used to impart rotational torque to the cap 10 about an axis of rotation 24. The handle grip 22 includes upstanding side walls 26, 28 arranged to lie parallel to each other and to extend upward from the top wall 20 away from the housing 16. The upstanding side walls 26, 28 include a top edge to which an upper wall 30 is appended. The handle grip 22 bisects the top wall 20 to create semi-circular portions 32, 34.

The top wall includes a perimeter edge 36. A cylindrical side wall 38 is appended to the perimeter edge 36 and extends downward toward the housing 16. Six retaining lugs 40 are appended to the cylindrical side wall 38. The retaining lugs 40 couple the housing 16, annular torque transmission ring 18, and shell 14 together.

Drive pins 42, 44 are integrally appended to the top wall 20 and extend downwardly from the top wall 20 along an axis parallel to the axis of rotation 24. Each drive pin 42, 44 lies in its own semi-circular portion 32, 34 so that drive pin 42 is situated in semi-circular portion 32 and drive pin 44 is situated in semi-circular portion 34. In the illustrated embodiment, the drive pins 42, 44 are the ejector pins formed in the plastics molding process to manufacture the shell 14. Once the shell 14 is ejected from its mold, the ejector pins are cut to a predetermined length to form the drive pins 42, 44. The length of the drive pins 42, 44 is selected so that the drive pins 42, 44 transmit rotation to the annular torque transmission ring 18. The drive pins 42, 44 are cylindrical in shape and are hollow due to their function as ejector pins. In alternative embodiments, the drive pins 42, 44 may be of a different length and shape and may be appended to the shell 14 in a different location or manner.

Figure 2:
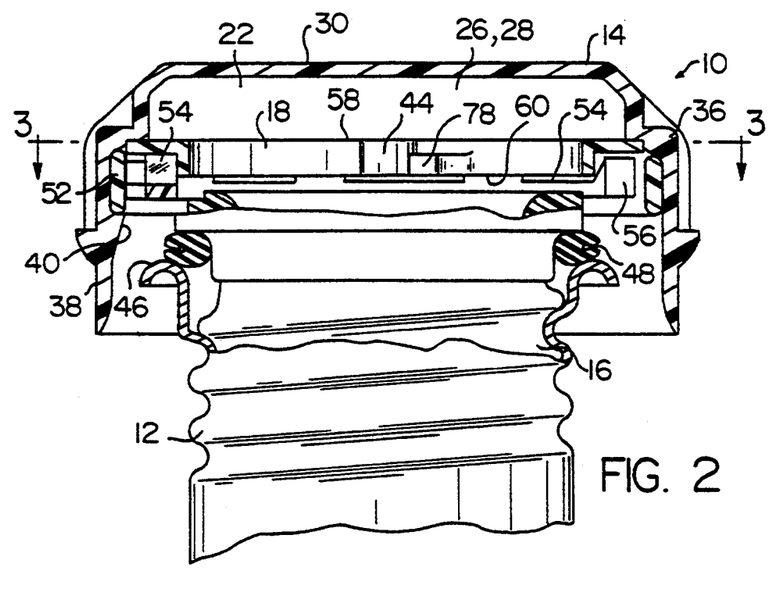
FIG. 2 is a side elevational view of the fuel cap of the present invention, with portions broken away, showing the fuel cap of FIG. 1 mounted in a filler neck-closing position on a filler neck.

The closure or housing 16 is configured to threadingly engage a threaded filler neck 12 in a conventional manner. The filler neck 12 terminates in an outwardly and downwardly extending sealing lip 46, as shown in FIG. 2. A gasket 48 is configured to seat against the sealing lip 46 and the housing 16 to provide a fluid-tight seal when the housing 16 is fully engaged into the filler neck 12.

Figure 3:
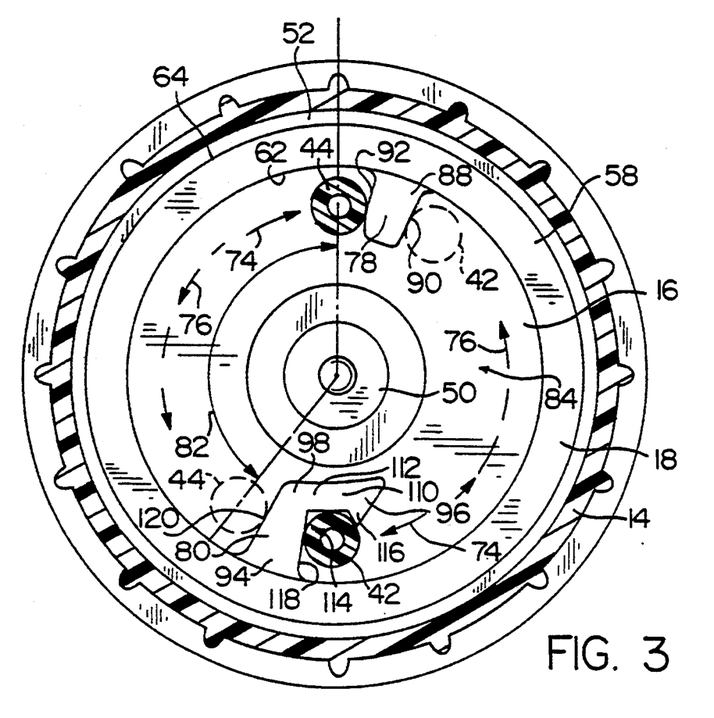
FIG. 3 is a sectional view taken along lines 3—3 of FIG. 2 showing one of the drive lugs on the handle retained in snap-fit relation in a pocket formed in the L-shaped driven lug on the annular torque transmission ring while the cap is positioned in its filler neck-closing position.

In FIG. 3, a pressure-vacuum valve assembly 50 is shown for illustrative purposes only in its conventional position disposed in the housing 16. The pressure-vacuum valve assembly 50 controls the venting of fuel vapor from the fuel tank when the pressure within the tank reaches a predetermined, superatmospheric level. The pressure-vacuum valve assembly 50 also controls the venting of air into the fuel tank when the pressure in the tank decreases to a predetermined, sub-atmospheric level. The pressure-vacuum valve assembly 50 is a conventional unit, and well known to those skilled in the art.

In addition, it will be understood that the novel features of the present invention are unrelated to the function of the pressure-vacuum valve assembly 50. Therefore, the inclusion of the assembly 50 is shown for illustrative purposes only. The cap 10 of the present invention will function regardless of the inclusion or omission of a pressure-vacuum valve assembly similar to the assembly 50.

The housing 16 includes a radially outwardly extending flange 52 at an axially upper portion of the housing 16. Six peripherally and slightly axially upwardly extending resilient fingers 54 are attached to the flange 52, as shown in FIG. 1. Each of the resilient fingers 54 terminates in a pawl tooth 56. As shown in FIG. 2, the flange 52 snaps into the assembled position between the retaining lugs 40 on the cylindrical side wall 38 and the annular torque transmission ring 18.

The annular torque transmission ring 18 includes an annular top wall 58, annular bottom wall 60, cylindrical inner edge 62, and a cylindrical outer edge 64. The annular torque transmission ring 18 is situated between the shell 14 and the housing 16 and is bounded by the cylindrical side wall 38 of the shell 14, as shown in FIG. 2. The annular top wall 58 faces the top wall 20 of the shell 14. The annular bottom wall 60 includes pockets 66 that are formed between spaced-apart teeth 68, as shown in FIG. 1. Each tooth includes an angled face 70 and an upright face 72. The annular bottom wall 60 cooperates with the resilient fingers 54, and specifically the angled faces 70 of the spaced-apart teeth 68 engage the pawl teeth 56 to provide a torque-overriding connection of the annular torque transmission ring 18 to the housing 16 in a cap-advancing direction 74 to permit advancement of the housing 16 into the filler neck 12. The torque-overriding connection prevents overtightening the housing 16 in the filler neck 12.

In addition, the upright faces 72 of the spaced-apart teeth 68 engage the pawl teeth 56 to provide a direct connection of the annular torque transmission ring 18 to the housing 16 in a cap-removal direction 76 to permit removal of the housing 16 from the filler neck 12. The cooperation of resilient fingers 54 and the annular torque transmission ring 18 to provide the torque-overriding connection in one direction and the direct connection in the other direction is well known in the art, and is specifically described in U.S. Pat. No. 4,280,346 to Evans, the entire specification and disclosure of which is hereby incorporated by reference.

The cylindrical outer edge 64 lies adjacent to the cylindrical side wall 38 of the shell 14. The cylindrical inner edge 62 is concentric to the cylindrical outer edge 64. Driven lugs 78, 80 are appended to the cylindrical inner edge 62. The drive pins 42, 44 extend downward from the top wall 20 into a region 84 bounded by the cylindrical inner edge 62 and engage with the driven lugs 78, 80 to transmit rotation from the shell 14 to the housing 16 as shown in FIG. 3.

The drive pins 42, 44 and driven lugs 78, 80 also cooperate to provide a delayed actuation driving connection. In the illustrated embodiment, the driven lugs 78, 80 are spaced apart 180° to provide approximately 160° of lost motion 82 that the drive pins 42, 44 must travel through once they disengage a first driven lug 78 in a first direction and before they engage a second driven lug 80 in a second direction. In alternative embodiments, the driven lugs 78, 80 may be spaced apart at any predetermined angular dimension to provide a desired lost motion distance 82.

In the illustrated embodiment, the first driven lug 78 is straight and the second driven lug 80 is L-shaped. Straight driven lug 78 extends radially inward toward the axis of rotation 24 a predetermined distance from a proximal end 88 appended to the cylindrical inner edge 62. The straight driven lug 78 includes side walls which extend radially outward toward the axis of rotation 24 from the proximal end 88 of the straight driven lug 78. The side walls include a cap-removal side 90 and a cap-advancing side 92. The straight driven lug 78 is used to engage with a drive pin 42, 44 to transmit rotation from the shell 14 to the housing 16. The cap-advancing side 92 engages the drive pin 44 in a cap-advancing direction 74 and the cap-removal side 90 engages the drive pin 42 in a cap-removal direction 76.

The L-shaped driven lug 80 has a proximal end 94 appended to the cylindrical inner edge 62 and a distal end 96. The L-shaped driven lug 80 includes a first member 98 which extends from the proximal end 94 radially outward toward the axis of rotation 24 a predetermined distance and a second member 110 which extends from a distal end 112 of the first member 98 circumferentially to the distal end 96 of the L-shaped driven lug 80. The L-shaped driven lug 80 is used to engage with a drive pin 42, 44 to transmit rotation from the shell 14 to the housing 16 and to create a pocket 114 for holding the drive pin 42 during rotation in the cap-advancing direction 74. An anti-drift retaining lug 116 is appended to the distal end 96 of the L-shaped driven lug 80 and extends radially outward from the axis of rotation 24 to create a drive pin-retaining pocket 114 for releasably retaining drive pin 42. The drive pin-retaining pocket 114 holds drive pin 42 stationary when the cap 10 is in its closed position as shown in FIG. 3. This ensures the cap 10 will not lose the 160° of lost motion 82 when the cap 10 is in the closed position due to cap drifting or the like.

The L-shaped driven lug 80 includes a retaining side 118 and a non-retaining side 120. The retaining side 118 is shaped to define the drive pin-retaining pocket 114. When the cap 10 is rotated in a cap-removal direction 76, drive pin 42 engages the cap-removal side 90 of the straight driven lug 78 and drive pin 44 engages the non-retaining side 120 of the L-shaped driven lug 80. When the cap 10 is rotated in a cap-advancing direction 74, drive pin 42 engages the retaining side 118 of the L-shaped driven lug 80 and drive pin 44 engages the cap-advancing side 92 of the straight driven lug 80.

In alternative embodiments, any number of drive pins 42, 44 or driven lugs 78, 80 may be used. In alternative embodiments, the driven lugs 78, 80 may include any combination of straight driven lugs 78 and L-shaped driven lugs 80.

Assuming that the cap 10 is removed from the filler neck 12 and an operator (not shown) desires to insert the cap 10 into the filler neck 12, the shell 14 is rotated in the cap-advancing direction 74 (clockwise) through the lost motion dimension 82 until the drive pin 44 engages the cap-advancing side 92 of straight driven lug 78 and the drive pin 42 engages the retaining side 118 of the L-shaped driven lug 80. This cap-advancing orientation is shown in FIG. 3. In this position, the drive pin 42 is releasably retained in the drive pin-retaining pocket 114.

This cap-advancing rotational movement acts to engage the housing 16 in the filler neck 12 and rotatably advance housing 16 toward gasket 48 and sealing lip 46 to seal the filler neck 12. The rotational movement of the shell 14, the annular torque transmission ring 18, and the housing 16 in a cap-advancing direction 74 is continued until the housing 16 is fully engaged in the filler neck 12 and the gasket 48 is trapped between the housing 16 and the filler neck 12. Further rotation of the shell 14 in the cap-advancing direction 74 results in the annular torque transmission ring 18 rotating with respect to the housing 16 due to the torque-overriding connection between the annular torque transmission ring 18 and the housing 16 as described previously to prevent overtightening of the housing 16.

Because the drive pin 42 is releasably retained within the drive pin-retaining pocket 114, the shell 14 is prevented from any drifting rotational movement in the cap-removal direction 76 (counterclockwise). This is advantageous because any drifting rotational movement of the shell 14 in the counterclockwise direction would reduce the predetermined amount of lost motion movement available between the shell 14 and the annular torque transmission ring 18. Thus, because the drive pin 42 is releasably retained within the drive pin-retaining pocket 114, the maximum amount of predetermined lost motion in the cap-removal direction 76 is maintained in the cap-removal direction 76 when the cap 10 is properly installed in the filler neck 12.

To remove the cap 10 from the filler neck 12, the operator begins rotating the shell 14 in the cap-removal direction 76. Initial rotation of the shell 14 in the cap-removal direction 76 forces the drive pin 42 out of the drive pin-retaining pocket 114 without imparting any rotational movement to the annular torque transmission ring 18 or the housing 16. As illustrated in FIG. 3, the shell 14 is rotated approximately 160° before the drive pin 42 engages the cap-removal side 90 of the straight driven lug 78 and the drive pin 44 engages the non-retaining side 120 of the L-shaped driven lug 80. Continued rotation of the shell 14 in the cap-removal direction 76 will impart direct rotational movement to the housing 16 to begin removing the housing 16 from the filler neck 12.

Although this invention has been described in detail with reference to certain embodiments, variations and modifications exist within the scope and spirit of the invention as described and as defined in the following claims.

I claim:

1. A cap for use in the filler neck of a tank, the cap comprising
  closure means for closing the filler neck,
  handle means for rotating the closure means relative to the filler neck about an axis of rotation, the handle means including a shell having a top wall bounded by a cylindrical side wall, a handle formed on the top wall for rotating the handle means, and an appendage directly appended to the underside of the top wall, the appendage cantilevered downwardly from the underside of the top wall at a location off-center from the axis of rotation of the handle, and
  delayed actuation means for providing a lost motion driving connection between the handle means and closure means, the delayed actuation means including an annular ring engaging the closure means and a driven lug appended to the annular ring, the driven lug engaging a terminal portion of the appendage during rotation of the handle means about its axis of rotation.

2. The cap of claim 1, wherein the annular ring lies inside the cylindrical side wall and includes a cylindrical outer edge adjacent to the cylindrical side wall, and a cylindrical inner edge concentric to the cylindrical outer edge, and the driven lug includes a proximal end appended to the cylindrical inner edge.

3. The cap of claim 2, wherein the driven lug is straight and is arranged to extend in a radially inward direction toward the axis of rotation of the handle means.

4. The cap of claim 2, wherein the driven lug is L-shaped and is formed to include means for grasping the driver during rotation of the handle means in a cap-advancing direction and anti-drift means for releasably retaining the driver in the grasping means.

5. The cap of claim 1, wherein the annular ring includes a cylindrical inner edge and the appendage extends downwardly from the top wall along an axis parallel to the axis of rotation of the handle means into a region bounded by the cylindrical inner edge.

6. The cap of claim 5, wherein the driven lug is appended to the cylindrical inner edge.

7. The cap of claim 5, wherein the driven lug is formed to include means for grasping the appendage during rotation of the handle means in a cap-advancing direction and anti-drift means for releasably retaining the appendage in the grasping means.

8. A cap for use in a filler neck of a tank, the cap comprising
closure means for closing the filler neck,
handle means for rotating the closure means relative to the filler neck about an axis of rotation, and
delayed actuation means for providing a lost motion driving connection between the handle means and closure means, the delayed actuation means including an annular ring engaging the closure means, a pair of driven lugs appended to the annular ring, and a pair of appendages of substantially uniform cross section directly appended to the underside of the handle means, the appendages cantilevered downwardly from the underside of the handle means and arranged to engage the pair of driven lugs during rotation of the handle means about its axis of rotation.

9. The cap of claim 8, wherein the handle means is a shell having a top wall, the top wall includes a handle oriented to bisect the top wall along a major diameter of the top wall to form a first and second semi-circular portion and a cylindrical side wall appended to the top wall, the pair of appendages are arranged to lie inside the cylindrical wall, and a first of the pair of appendages is situated in the first semi-circular portion and a second of the pair of appendages is situated in the second semi-circular portion.

10. The cap of claim 9, wherein the shell is a molded plastic shell including ejector pins for releasing the shell from the mold and the pair of appendages are formed by cutting short the hollow cylindrical ejector pins used in the molding process.

11. The cap of claim 9, wherein the pair of appendages extend downwardly from the top wall along an axis parallel to the axis of rotation.

12. The cap of claim 9, wherein the annular ring lies inside the cylindrical side wall in between the top wall and closure means, the annular ring includes a cylindrical outer edge adjacent to the cylindrical side wall and a cylindrical inner edge concentric to the cylindrical outer edge, and the pair of driven lugs are appended to the cylindrical inner edge of the annular ring and extend radially inward toward the axis of rotation.

13. The cap of claim 12, wherein the pair of driven lugs are appended to the cylindrical inner edge and include a straight driven lug and a L-shaped driven lug, the L-shaped lug includes means for grasping the first drive pin during rotation of the handle means in a cap-advancing direction and anti-drift means for releasably retaining the first drive pin in the grasping means.

14. The cap of claim 9, wherein a first of the pair of driven lugs is L-shaped and includes means for grasping the first drive pin during rotation of the handle means in a cap-advancing direction and anti-drift means for releasably retaining the first drive pin in the grasping means, and a second of the pair of driven lugs is straight and extends radially inward toward the axis of rotation.

15. The cap of claim 14, wherein the L-shaped driven lug includes a retaining side and a non-retaining side, the retaining side includes the grasping means and the anti-drift means, the first appendage engages the straight driven lug, the second appendage engages the non-retaining side of the L-shaped driven lug when rotating the handle in a cap-removal direction, the first appendage engages the retaining side of the L-shaped driven lug, and the second appendage engages the straight driven lug when rotating the handle in a cap-advancing direction.

16. The cap of claim 14, wherein the grasping means includes a first member appended to the cylindrical inner edge of the annular ring and extending radially inward toward the axis of rotation and a second member circumferentially extending from a distal end of the first member, and the anti-drift means includes a retaining lug located at a distal end of the second member to form a drive pin-retaining pocket.

17. The cap of claim 8, wherein the delayed actuation means includes placing the pair of driven lugs arranged in a spaced-apart relationship to provide a lost motion and the pair of driven lugs are spaced apart 180° so that 160° lost motion exists.

18. A cap for use in the filler neck of a tank, the cap comprising
closure means for closing the filler neck,
torque transmission means for rotating the closure means relative to the filler neck,
handle means for rotating the torque transmission means to rotate the closure means relative to the filler neck about an axis of rotation,
an appendage appended to the underside of the handle means and extending in a direction toward the closure means, and
delayed actuation means for providing a lost-motion driving connection between the handle means and the closure means so that the handle means rotates a predetermined amount between a first and second position before rotating the closure means relative to the filler neck, the delayed actuation means including an L-shaped driven lug arranged to engage the appendage, the L-shaped driven lug including means for grasping the appendage during rotation of the handle means in a cap-advancing direction and anti-drift means for restraining movement of the appendage in the cap-removal direction said L-shaped driven lug having a surface facing radially outwardly to form a part of said grasping means.

19. The cap of claim 18, wherein the handle means includes a shell having a top wall bounded by a cylindrical side wall, a handle formed in the top wall for rotating the handle means, and an appendage directly appended to the underside of the top wall and arranged to lie inside the cylindrical sidewall.

20. The cap of claim 19, wherein the appendage is cantilevered downwardly from the top wall and along an axis parallel to the axis of rotation.

21. The cap of claim 18, wherein the torque transmission means includes an annular ring with a cylindrical outer edge adjacent to the cylindrical side wall, and a cylindrical inner edge concentric to the cylindrical outer edge, and the delayed actuation means further includes a driven lug appended to the cylindrical inner edge.

22. The cap of claim 21, wherein the appendage is cantilevered downwardly from the top wall and arranged to engage the driven lug when the handle means rotates about its axis of rotation.

23. A cap for use in the filler neck of a tank, the cap comprising
closure means for closing the filler neck,
handle means for rotating the closure means relative to the filler neck about an axis of rotation including an appendage appended directly to the underside of the handle means and cantilevered downwardly therefrom in an axial direction only, and
delayed actuation means for providing a lost motion driving connection between the handle means and closure means so that the handle means rotates a predetermined amount before rotating the closure means relative to the filler neck, the delayed actuation means including an annular ring lying in between the closure means and handle means and a driven lug appended to the annular ring and arranged to engage the appendage during rotation of the handle means, the driven lug being arranged to partially envelope the appendage during rotation of the handle means in the cap-advancing direction to restrain movement of the handle means in the cap-removal direction, the driven lug being further arranged to release the appendage during rotation of the handle means in the cap-removal direction.

24. The cap of claim 23, wherein the annular ring includes a cylindrical outer edge, a cylindrical inner edge concentric to the cylindrical outer edge, and a bottom side engages the closure means, and the driven lug is appended to the cylindrical inner edge.

25. The cap of claim 24, wherein the driven lug is straight and extends radially inward toward the axis of rotation.

26. The cap of claim 24, wherein the driven lug is L-shaped, the L-shaped lug includes a first member having a proximal end appended to the cylindrical inner edge and a distal end extending radially inwardly toward the axis of rotation a predetermined distance, a second member having a proximal end integrally appended to the distal end of the first member, the second member extending circumferentially to a distal end of the L-shaped lug, and a retaining lug integrally appended to the distal end of the L-shaped lug and extending radially outwardly from the axis of rotation at the distal end, the L-shaped lug being formed to include means for grasping the appendage during rotation of the handle means in a cap-advancing direction and anti-drift means for releasably retaining the appendage in the grasping means.

27. The cap of claim 26, wherein the grasping means includes the portion of the L-shaped lug which extends from the proximal end to the distal end, and the anti-drift means includes the retaining lug which forms an appendage-retaining pocket with the L-shaped lug.

28. The cap of claim 24, wherein a first and second driven lug are appended to the cylindrical inner edge and extend radially inward toward the axis of rotation, the delayed actuation means further includes first and second appendages appended directly to the underside of the handle means and cantilevered downwardly from the handle means into a region bounded by the cylindrical inner edge, the first and second driven lugs and the first and second appendages are arranged so that in a cap-advancing direction the first appendage engages the first driven lug and the second appendage engages the second driven lug and in a cap-removal direction the first appendage engages the second driven lug and the second appendage engages the first driven lug.

29. The cap of claim 28, wherein the first driven lug is L-shaped, the L-shaped driven lug includes grasping means for grasping the first appendage and anti-drift means for releasable retaining the first appendage in the grasping means, and the second driven lug is straight and is arranged to extend in a radially inward direction toward the axis of rotation.

30. A fuel cap for closing the threaded filler neck of a fuel tank, the cap comprising
a housing having threads for engaging the filler neck,
sealing means for sealingly engaging the filler neck upon rotation of the housing in one direction to prevent an outward flow of vapor or liquid to the atmosphere,
handle means for rotating the housing relative to the filler neck about an axis of rotation,
delayed actuation means for providing a predetermined amount of relative rotation between the handle means and housing before the handle means rotates the housing relative to the filler neck sufficiently to break the seal provided by the sealing means, the delayed actuation means including an annular ring engaging the closure means, a driven lug appended to the annular ring, and an appendage directly appended to the underside of the handle means and cantilevered downwardly from the underside of the top wall, the appendage being arranged to engage the driven lug during rotation of the handle means about its axis of rotation,
means for grasping the drive pin during rotation of the handle means in a cap-advancing direction, the grasping means including an L-shaped driven lug having a first member having a proximal end appended to the cylindrical inner edge and a distal end extending radially inwardly toward the axis of rotation and a second member having a proximal end integrally appended to the distal end of the first member, the second member extending circumferentially to a distal end of the L-shaped lug, and
anti-drift means for releasably retaining the drive pin when the cap is closed to hold the handle means stationary in the grasping means so that drifting rotation of the cap is substantially blocked thereby maintaining the predetermined amount of relative rotation between the handle means and housing, the anti-drift means including a retaining lug at the distal end of the L-shaped driven lug, the retaining lug extending radially outward from the axis of rotation to form an appendage-retaining pocket.

31. A cap for use in the filler neck of a tank, the filler neck having an annular lip defining a mouth, the cap comprising
gasket means for sealing the filler neck, means for urging the gasket means against the annular lip to block the filler neck and establish a seal blocking an outward flow of fluid and vapor in the filler neck through the filler neck mouth, and means for applying a driving force to move the urging means relative to the annular lip of the filler neck from a gasket means-tightening position establishing said seal to a gasket means-releasing position breaking said seal, the urging means and the applying means cooperating to provide means for permitting relative movement between the urging means and the applying means to delay establishment of a driving connection between the applying means and the urging means during movement of the applying means in a cap-removal direction, the applying means including a handle having a downwardly cantilevered appendage directly appended to the underside of the handle, said appendage extending in an axial direction only, the urging means including an annular ring having at least one driven lug, a first of the at least one driven lugs being L-shaped and formed to include a first member having a proximal end appended to the annular ring and a distal end extending radially inwardly and a second member having a proximal end integrally appended to the distal end of the first member, the second member extending circumferentially and terminating at a distal end of the L-shaped lug.

* * * * *

UNITED STATES PATENT AND TRADEMARK OFFICE
CERTIFICATE OF CORRECTION

PATENT NO. : 5,449,086
DATED : September 12, 1995
INVENTOR(S) : Robert S. Harris It is certified that error appears in the above-indentified patent and that said Letters Patent is hereby corrected as shown below:

In Column 9, at line 4 (claim 21), "of claim 18" should be --of claim 19--.

Signed and Sealed this

Third Day of December, 1996

*Attest:*

BRUCE LEHMAN

*Attesting Officer*  Commissioner of Patents and Trademarks

UNITED STATES PATENT AND TRADEMARK OFFICE
CERTIFICATE OF CORRECTION

PATENT NO. : 5,449,086
DATED : September 12, 1995
INVENTOR(S) : Robert S. Harris It is certified that error appears in the above-identified patent and that said Letters Patent is hereby corrected as shown below:

Column 9, line 4 (claim 21), "of claim 18" should be --of claim 19--.

Signed and Sealed this

Sixteenth Day of December, 1997

Attest:

BRUCE LEHMAN

*Attesting Officer*

*Commissioner of Patents and Trademarks*